United States Patent [19]

Myers et al.

[11] 4,239,727
[45] Dec. 16, 1980

[54] METHOD AND APPARATUS FOR THERMOFORMING THERMOPLASTIC FOAM ARTICLES

[75] Inventors: Donald W. Myers; Samantha L. Vivlamore, both of Canandaigua, N.Y.

[73] Assignee: Mobil Oil Corporation, New York, N.Y.

[21] Appl. No.: 942,836

[22] Filed: Sep. 15, 1978

[51] Int. Cl.³ .................... B29C 17/03; B29D 27/00
[52] U.S. Cl. ................... 264/550; 264/321; 425/384; 425/388; 425/398
[58] Field of Search ............... 264/321, 51, 94, 550, 264/551; 425/314, 388, 398, 384; 229/1.5 B

[56] References Cited

U.S. PATENT DOCUMENTS

| | | | |
|---|---|---|---|
| 3,260,781 | 7/1966 | Lux et al. | 264/321 |
| 3,667,889 | 6/1972 | Martelli | 425/314 |
| 3,789,095 | 1/1974 | Winstead | 264/51 |
| 3,814,784 | 6/1974 | Wolf | 264/94 X |
| 3,825,166 | 7/1974 | Padovani | 229/1.5 B |
| 3,917,770 | 11/1975 | Jackson | 264/321 X |
| 3,933,562 | 1/1976 | Cruckshank et al. | 264/94 X |
| 3,978,182 | 8/1976 | Luthra | 264/321 X |
| 4,025,275 | 5/1977 | Gournelle | 425/398 X |

*Primary Examiner*—Philip Anderson
*Attorney, Agent, or Firm*—Charles A. Huggett; Lowell G. Wise

[57] ABSTRACT

A method and apparatus for thermoforming plastic foam articles comprising the sequential steps of (a) preheating the plastic foam, usually supplied in the form of a continuous sheet stock, (b) clamping, in a fixed position, that portion of the stock material which is to be thermoformed, (c) initially deforming the preheated foam stock with a portion of a male mold member to form a preform, (d) drawing a vacuum on the interior of the female mold member to assist in completion of the thermoforming operation, and (e) completing formation of the desired article by deformation of the preform between a male and female thermoforming device.

5 Claims, 8 Drawing Figures

METHOD AND APPARATUS FOR THERMOFORMING THERMOPLASTIC FOAM ARTICLES

BACKGROUND OF THE INVENTION

1. Field of the Invention

The present application relates to a method and apparatus employed to thermoform thermoplastic foam materials such as polystyrene foam utilizing a matched mold thermoforming operation which employs both a plug assist and vacuum draw during the molding step.

2. Brief Description of Prior Art Practices

In the past, matched mold thermoforming has been commonly employed to form articles from preformed thermoplastic sheet material, which sheet is initially formed utilizing well known thermoplastic extrusion techniques. The sheet is subsequently preheated and placed between male and female mold halves, which, as they close, press and form the sheet into the desired product shape. Obviously, in such an operation, the material distribution of the formed product will depend upon the shapes of the mold halves.

An alternate forming arrangement which may be employed to thermoform plastic sheet includes vacuum thermoforming. A vacuum is applied beneath the preheated sheet to be formed causing atmospheric pressure to push the sheet down into contact with the mold. As the sheet contacts the mold it cools and sets in the desired configuration. Usually those areas of the sheet material which reach the vacuum mold member last are the thinnest having been drawn to a greater extent than the remainder of the material being formed.

Other prior art thermoforming techniques include a two-stage thermoforming technique whereby, utilizing a plug member, a preheated plastic sheet is only partially preformed into a desired configuration and, after the preforming step, the thermoforming step is completed whereby the matched mold members come together to form the desired finished article. U.S. Pat. No. 3,825,166 discloses such a forming method.

SUMMARY OF THE INVENTION

In accordance with the method and apparatus employed to thermoform foam articles, such as polystyrene foam, as practiced in accordance with the present invention, after a foam thermoplastic sheet is preheated to a desired temperature, a plug member of specific design is employed to prestretch and preform the foam material into the female cavity. When the plug member reaches its fully extended position, a brief delay interval on the order of from about 0.1 up to about 2.0 seconds and preferably from about 0.6 up to about 1.2 seconds is allowed to elapse before completion of the thermoforming step by vacuum draw followed by complete closure of the matched mold elements. Following formation of the desired article, the mold halves are separated and the thermoplastic sheet is cycled forward to a station where the formed foam article may be trimmed from the sheet before the molding cycle is repeated again.

DESCRIPTION OF SPECIFIC EMBODIMENTS

Figure 1:
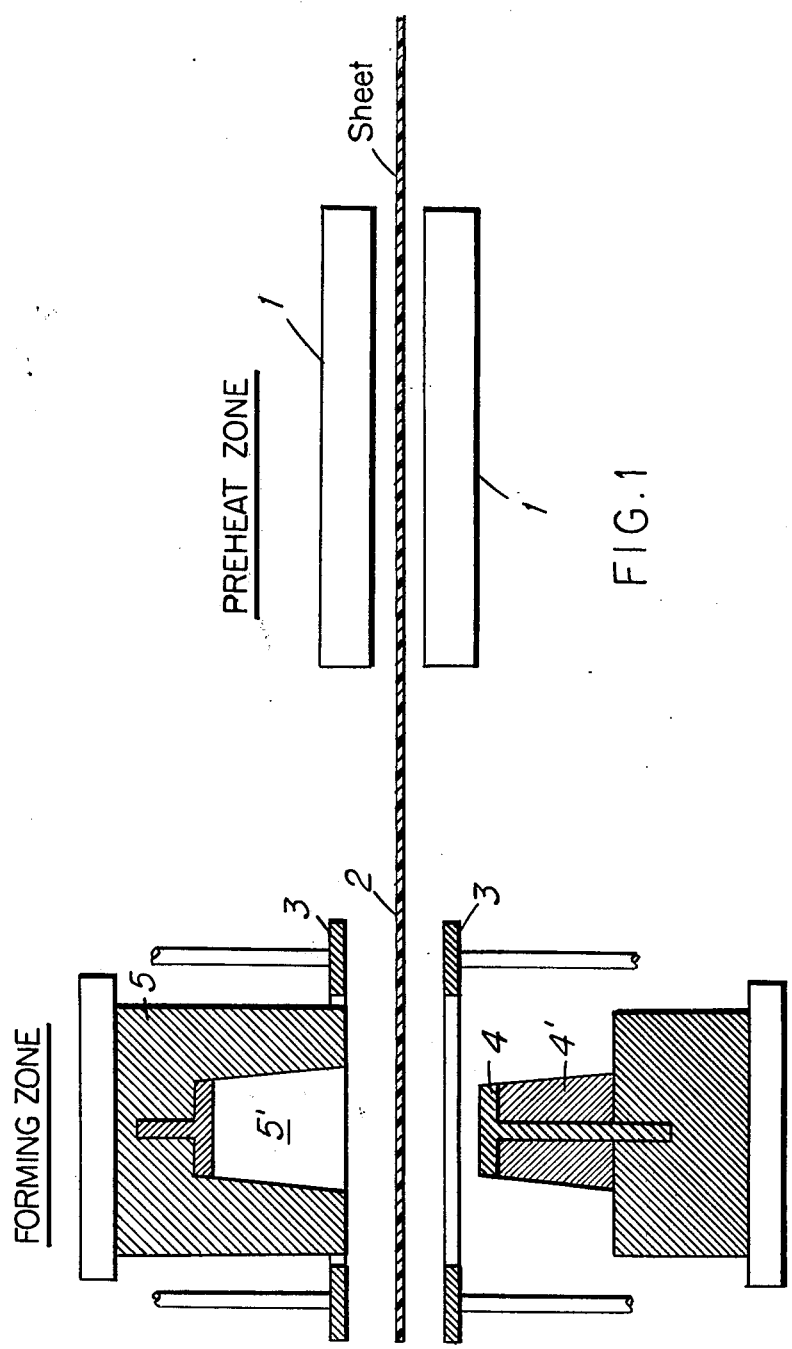
FIG. 1 is a schematic view of the apparatus in accordance with the present invention showing a thermoplastic foam sheet as it progresses through a preheat zone and into the forming mold.

In accordance with the present invention, articles are formed from preformed sheets of polystyrene foam. The foam is manufactured utilizing a direct injection extrusion process in accordance with prior art techniques. Briefly, the solid resin particles, mixed with the nucleating agent system, such as, for example, a mixture of sodium bicarbonate and citric acid, are fed into the feed hopper of a rotating screw extruder which melts and mixes the material. Downstream from the feed hopper liquid pentane, which serves as a blowing agent, is injected directly into the extruder. These materials are further mixed and eventually the molten polymer is extruded through an annular shaped die to form a tube which is subsequently drawn over an internal mandrel, slit and opened into a flat foam sheet which is characterized by having a dense outer layer oftentimes referred to as a "skin." The sheet is then wound into roll form and stored for subsequent use.

The present invention provides a method for producing thermoformed foam articles such as cups which have a range of depth to top diameter ratio which is higher than those previously attainable on such objects when they are formed using a match mold forming technique. Additionally, utilizing the method of the present invention, the formed objects themselves have a material distribution along the side walls and base which is sufficient to impart high strength to the articles making them adaptable for a variety of end use applications.

In practicing a specific mode of the present invention, a preformed polystyrene foam sheet material having a thickness of from about 0.05" to 0.2", and preferably from about 0.09" to 0.125" is preheated to a requisite forming temperature. The requisite forming temperatures may vary widely depending upon the composition and properties of the plastic being molded. However, in the case of polystyrene foam forming temperatures on the order of from about 245° F. up to about 285° F. and preferably from about 255° F. to about 275° F. are preferred. The preheated foam sheet is subsequently fed between the mold halves of a thermoforming mold where it is formed into the desired article using a combination of matched mold, plug-assist, and vacuum forming. That is, after the sheet is initially firmly clamped and restrained in place, a plug member stretches the sheet as the mold cavity closes over it. When the cavity is completely closed, a vacuum is applied from the cavity side (i.e., the female mold member) completing formation of the article. The matched core (i.e., male mold member) is then closed into the cavity to provide a controlled thickness of the final article as it also chills the article to set it and hold its final shape.

The finished article properties are determined by a range of variables including foam sheet density, cell size, gauge, skin thicknesses, material temperature during forming, the design of the plug employed in the plug assist forming step, the material of construction of the plug, and the timing of the component steps of the forming cycle.

EXAMPLE 1

Figure 3:
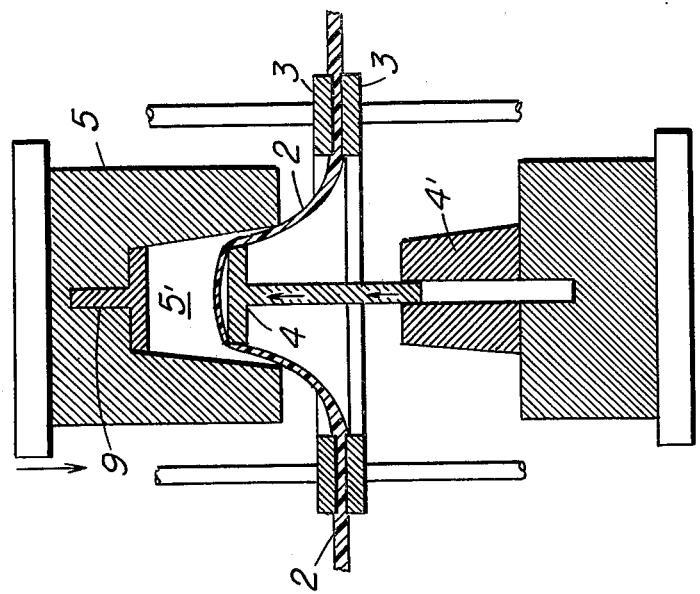
FIGS. 2 through 7, inclusive, are schematic views in sequence of the molding apparatus of the present invention being employed to form a polystyrene cup.
Figure 2:
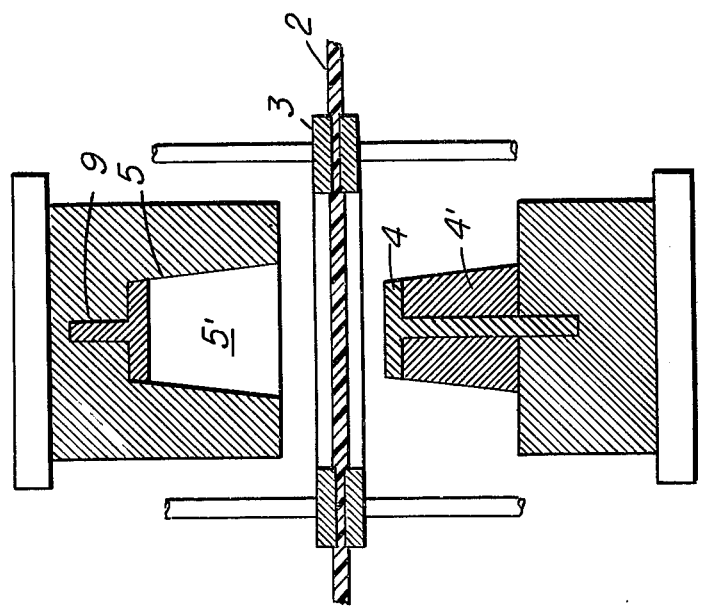

Utilizing the hereinabove described direct injection extrusion process, a polystyrene foam sheet is produced having a density of about 11 lb/ft$^3$ and a thickness of about 0.1". The outer skin layer on the polystyrene foam sheet has a thickness of about 0.003". As shown in FIG. 1, the polystyrene foam sheet is initially passed through a preheat zone 1 wherein, utilizing radiant heaters, the sheet temperature is elevated to a temperature at which it may be easily formed into the desired article, i.e., a temperature of about 265° F. The preheated polystyrene foam sheet 2 is, as shown in FIG. 1, subsequently fed to the forming zone whereat it is clamped into a fixed position utilizing ring elements 3 which are located above and below the preheated sheet, said ring elements 3 completely surrounding the forming station. This is more clearly shown in FIG. 2 wherein clamp members 3 have secured the foam sheet and restrained it in position prior to forming. As shown in FIG. 3, plug element 4 is extended from male mold member 4' and is used to prestretch foam sheet 2 partially into cavity 5'.

Figure 4:
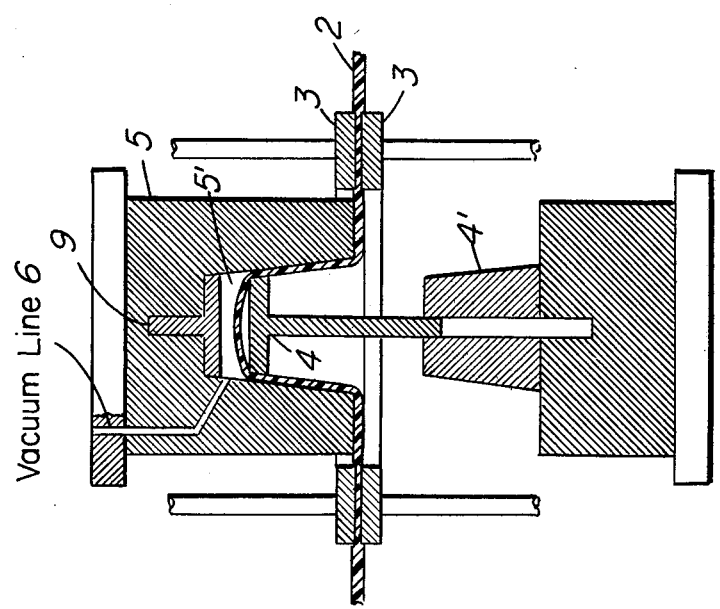

The mechanism for operation of the mold elements, not shown, is a common prior art arrangement. The mold members 4 and 5 are each mounted on platens which are operated hydraulically and according to the sequencing programmed into the thermoformers. After sheet 1 is heated and fed into the forming zone, the platen that female mold member 5 is mounted on begins closing. As this platen closes, it activates next a number of limit switches; first, one which activates clamping elements 3; one which activates plug element 4 which also is hydraulically operated. When this platen is completely closed, the platen that male mold member 4 is mounted on begins closing. As this platen closes, it activates one limit switch; that which controls the vacuum. The vacuum is operated as the platen just starts closing, well in advance of the molds being completely closed; therefore the formation of the article is completed by the vacuum. The total closure of the molds only provides for a controlled thickness and cooling of the article. As plug 4 prestretches the foam into cavity 5', female mold element 5 is simultaneously closing toward mold member 4'. (see FIG. 4) When plug element 4 is completely extended, a delay of about 0.9 seconds occurs before the vacuum is actuated within the confines of cavity 5'. It has been found that if the dwell time is too short, i.e., less than about 0.1 seconds, article thickness on the bottom and lower sidewalls is unacceptably reduced. If the dwell time is too long, the sheet cools excessively, and fractures when vacuum is applied.

Figure 5:
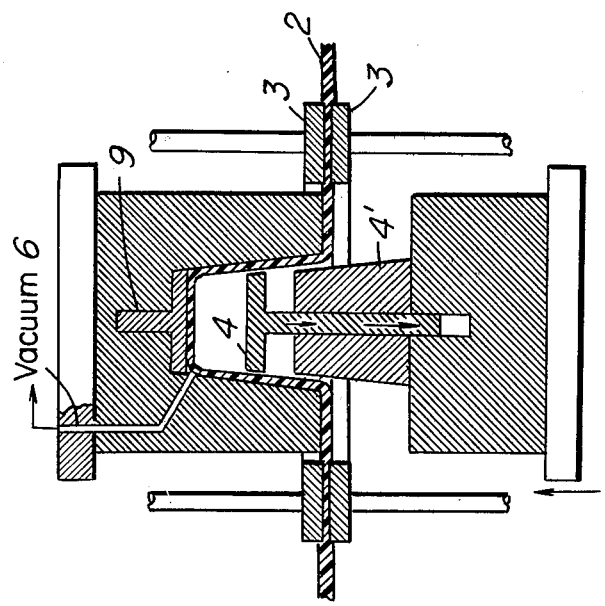
Figure 7:
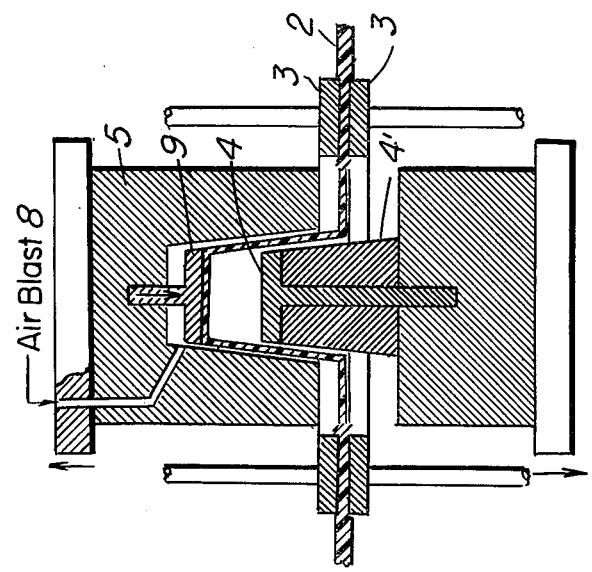
Figure 6:
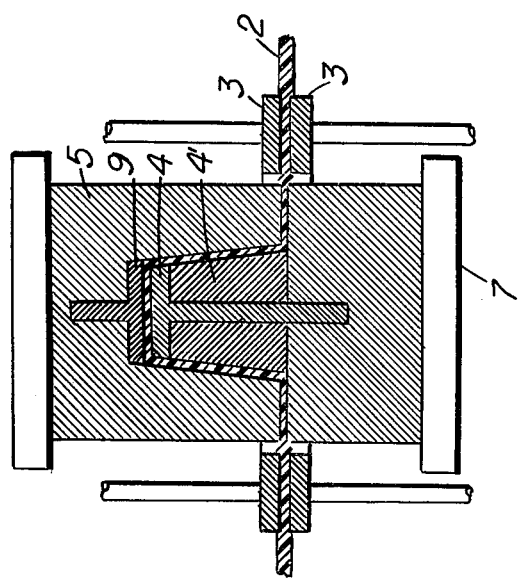
Figure 8:
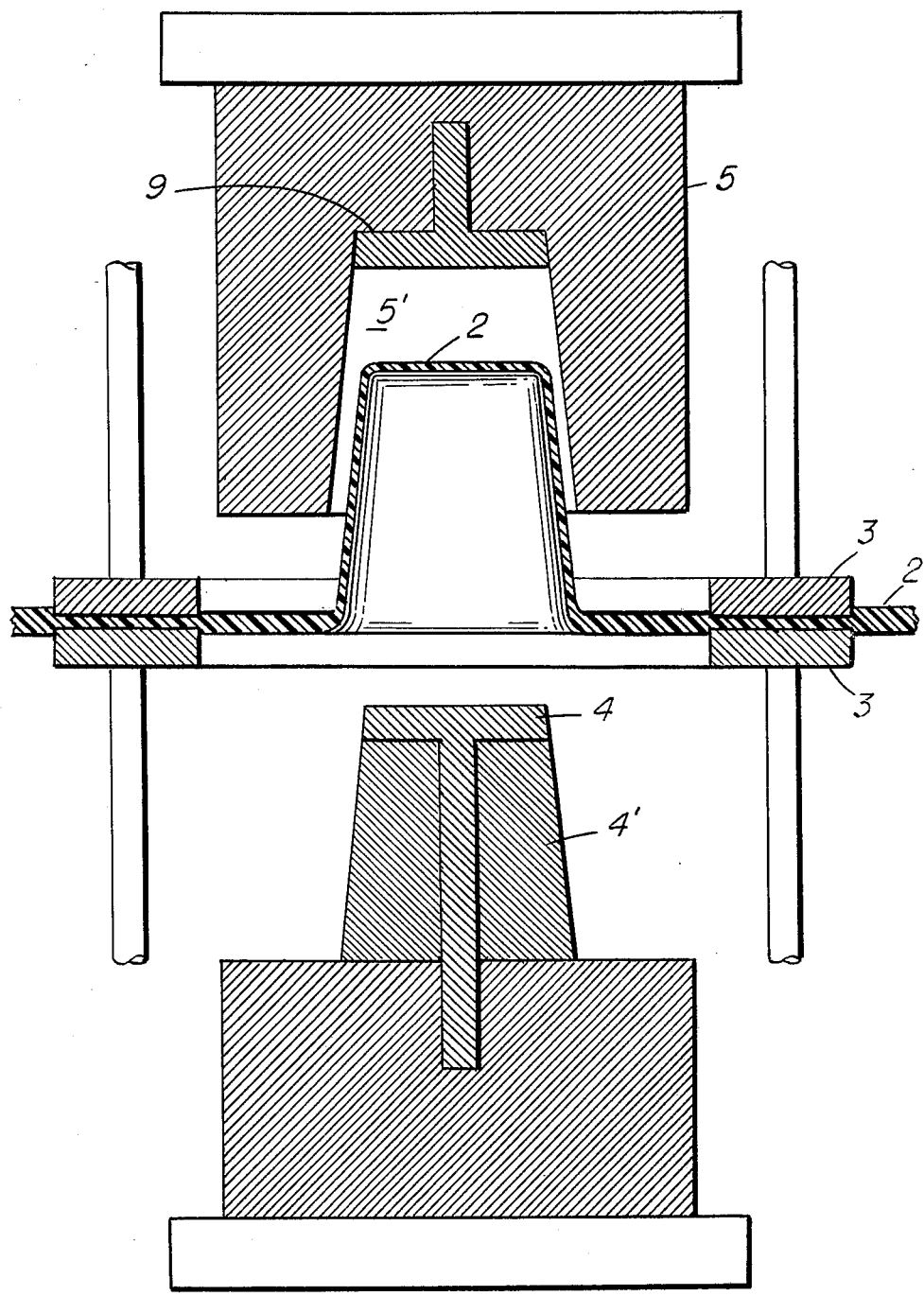
FIG. 8 is a schematic view of the partially open mold halves following article formation.

As more clearly shown in FIG. 5, a controlled vacuum is applied through conduit line 6 by conventional means not shown. The vacuum is applied to the sheet through cavity 5' for 0.6 seconds. This pulls the sheet away from plug 4 and into cavity 5'; simultaneously, core member 4' is closing into cavity 5' and plug 4 is retracting into core 4'. As shown in FIG. 6, core 4' is now completely closed into cavity 5' to provide a controlled article thickness, i.e., the predetermined fixed gap which exists between the mold elements when in a closed position. The core or male mold element 4' additionally cools the formed article to prevent its warpage upon opening of the mold elements. After a sufficient dwell time of about 1.8 seconds, the mold members open as shown in FIG. 7 and an air blast is applied through conduit 8 to assist in the ejection of the now formed cup from the female mold cavity 5'. Additionally, an ejection piston 9, which is located at the top of cavity 5' is actuated to loosen and force the formed article out of cavity 5'. The mold elements are finally opened completely, as illustrated in FIG. 1, and the sheet subsequently indexes forward after which the forming cycle is repeated. The advancing sheet is eventually forwarded to a trim station (not shown) whereat the finished article is trimmed or cut from the sheet.

During the forming operation the mold elements, i.e., 4,4' and 5 are temperature controlled within a range of from about 50° F. to about 250° F., and preferably the male mold element 4—4' is maintained at a temperature of from about 180° F. up to about 210° F. The female mold element is maintained at a temperature of from about 150° F. up to about 200° F. In the present example, mold 4—4' was maintained at a temperature of about 200° F. and mold 5 was maintained at about 180° F. The preheat oven temperature ranged from about 445° F. up to about 572° F.

It has been found that an important element for successful forming in accordance with the method of the present invention is the specific design of the plug member 4 as well as its material of construction. The plug shape and material directly control the distribution of the foam sheet material along the side walls of the article being formed. Different materials of construction will result in marked differences in the distribution of material. Accordingly, plug construction material must be individually selected depending upon the shape of the article being formed and the desired material distribution in the formed article. Suitable materials include steel, nylon, aluminum, and syntactic foam, for example. Typically, a desirable plug material is one which is a good thermal insulator, i.e., it neither heats up nor cools down during the forming operation.

In the preceding example where a cup was formed which is characterized by a depth to top diameter ratio on the order of about 1.25:1 and a wall thickness of about 0.050" a steel plug shaped exactly to the base of the cup and about 0.250 inches in length produces excellent results. It will be understood that the method of the present invention is not limited to a single cavity mold operation, but multiple cavity molds may also be employed.

The thermoformed cup which was produced in Example 1 had the following dimensions:

| | |
|---|---|
| Height | 3.504" |
| Top Diameter | |
| Outer Diameter | 3.33" |
| Inner Diameter | 3.014" |
| Bottom Diameter | |
| Outer Diameter | 2.005" |
| Inner Diameter | 1.920" |
| Side Wall Angles | 9° |
| Density | 4.5–5 g./cc. |

It will be noted that the density of the cup produced in accordance with Example 1 was from about 4.5 to about 5 g./cc. When using prior art forming techniques, such desirably low densities were unobtainable. Densities on the order of above about 10 g./cc. and even higher are common utilizing the prior art cup thermoforming techniques.

It is to be understood that the foregoing description is merely illustrative of preferred embodiments of the invention, of which many variations may be made by those skilled in the art within the scope of the following claims without departing from the spirit thereof.

What is claimed is:

1. A method of thermoforming thermoplastic foam articles comprising, in sequence, the steps of:
   a. preheating a sheet of thermoplastic foam stock material;
   b. clamping said preheated stock material in a fixed position between matched male and female mold members;
   c. initially partially deforming said preheated stock material toward a forming cavity of said female mold by extending a plug member from said male mold member;
   d. maintaining said stock material in a partially deformed condition with said plug extended for an interval of from about 0.1 to about 2.0 seconds without substantial cooling of said stock material;
   e. completely forming said article by drawing said partially formed preheated sheet into a forming cavity by vacuum and closing the matched male mold member to chill the stock material and set a final shape therein.

2. A method in accordance with claim 1 wherein said thermoplastic foam stock material consisting essentially of foamed polystyrene is preheated to a temperature of from about 245° F. up to about 285° F.

3. A method in accordance with claim 1 wherein said deformed stock material is maintained in a partially deformed condition for a period of about 0.9 seconds.

4. Apparatus for deep-draw forming thermoplastic foam articles comprising:
   a. means for heating a sheet of thermoplastic foam stock material;
   b. matched molding means including cool female mold means having a deep cavity therein and male mold means having a plug member and cool core member;
   c. means for clamping said heated stock material in a restrained and fixed position between said female and male mold means;
   d. means for extending said plug member from said male mold means in order to deform said heated thermoplastic sheet partially toward said female mold cavity, including means for maintaining said heated thermoplastic sheet fixed in partially deformed position for about 0.1 to about 2 seconds;
   e. means for closing said female mold means upon said sheet material;
   f. means for drawing vacuum through said female mold cavity to pull said sheet material away from said extended plug member and assist in thermoforming said heated sheet material;
   g. means for closing said matched molding means by moving said plug member and said core member together toward said female mold means to cool the stock material, thereby setting a final shape therein; and
   h. means for separating said matched molding means.

5. The apparatus of claim 4 including means for ejecting said articles.

* * * * *